Jan. 18, 1966 C. H. PAGE 3,230,478

AMPLITUDE STABILIZING CIRCUIT FOR ELECTRON TUBE OSCILLATORS

Filed Oct. 5, 1951

INVENTOR.
Chester H. Page
BY
G. J. Kessenich + A. W. Dew
ATTORNEYS

United States Patent Office 3,230,478

Patented Jan. 18, 1966

3,230,478

AMPLITUDE STABILIZING CIRCUIT FOR ELECTRON TUBE OSCILLATORS

Chester H. Page, Silver Spring, Md., assignor to the United States of America as represented by the Secretary of the Army Filed Oct. 5, 1951, Ser. No. 250,012
4 Claims. (Cl. 331—183)
(Granted under Title 35, U.S. Code (1952), sec. 266)

The invention described herein may be manufactured and used by or for the Government of the United States of America for governmental purposes without the payment of any royalties thereon or therefor.

This invention relates to radio proximity fuses of the radiating-detector type and more particularly to an instability anticipator means for preventing instability in the radio frequency oscillator of the fuse.

The radio proximity fuse for explosive missiles has incorporated therein a miniature radio frequency transmitter-receiver of the radiating-detector type which emits radio frequency waves from an antenna carried by the missile. As the missile approaches the target, some of the radiation is reflected by the target and received by the fuse through the antenna in continuously varying phase relationship to that transmitted. The effect on the transmitter-receiver of this changing phase difference between the transmitted and reflected wave is the generation of an audio frequency voltage in the transmitter-receiver. This voltage is of Doppler frequency and is amplified by an audio frequency amplifier to fire an electric detonator when the amplitude of the reflected radiation reaches a certain predetermined level at the desired distance from missile to target.

The reflected waves interfere with the radiated waves and alter the total flow of energy into space as the fuse is carried by the missile towards the target and hence alter or modulate the antenna impedance in a certain definite manner. The rate of change of antenna impedance, or the frequency of modulation, is called the Doppler frequency. The change in the radiation resistance component of the antenna impedance is reflected in the grid circuit of the radiating-detector and may result in an unstable oscillator when the oscillator is adjusted for maximum sensitivity, that is a maximum grid voltage change for a given radiation resistance.

An object of the invention is an ultra-high radio frequency oscillator having a high sensitivity in terms of the change of grid bias voltage per fractional change of the oscillator load resistance, as well as, the highest power output for a given oscillator.

Another object of the invention is a radio frequency oscillator whose grid bias voltage is an indication of the radio frequency resistance of the oscillator load.

Another object of the invention is a stabilizing circuit to prevent intermittant oscillation or squegging in a radio frequency oscillator using abnormally high grid leak resistance.

A further object of the invention is the combination of a reaction grid detector oscillator and stabilizing circuit as a radiation resistance variation detector for use in proximity detecting devices.

The specific nature of the invention as well as other objects and advantages thereof will clearly appear from the following description and accompanying drawings in which.

Figure 1:
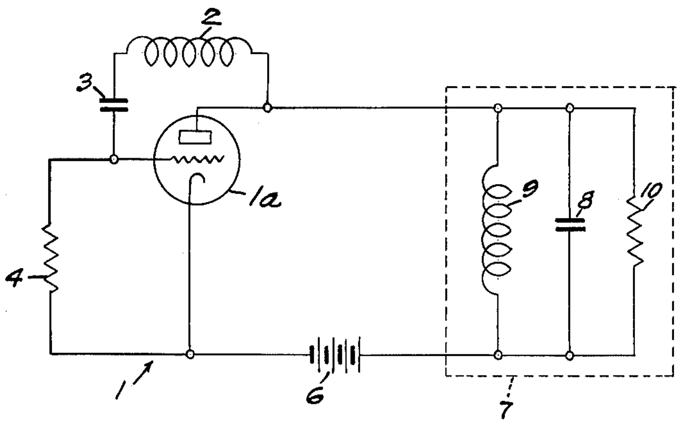
Fig. 1. PRIOR ART
FIGURE 1 is a schematic diagram of a conventional reaction grid detector.

Referring to the drawings by characters of reference there is shown in FIGURE 1 a schematic diagram of a reaction grid detector typical of the radiating-detector type used in radio proximity fuses, but not employing the instability anticipator means of the invention. The reaction grid detector is generally designated by reference numeral 1 and comprises an ultra-high frequency oscillator of the Colpitts type wherein 1*a* indicates an oscillator tube having inductor 2 connecting the anode and grid elements of the tube through the grid blocking capacitor 3. The grid leak resistor 4 connects the grid element with the cathode element of the triode. The battery 6, or any suitable power supply, is connected in the anode circuit of the oscillator tube 1*a*. The dotted square 7 represents the antenna load of the oscillator wherein 8, 9 and 10 indicate the antenna capacitance, inductance and radiation resistance, respectively.

The variations of the antenna radiation resistance 10 to be detected are shunted by the antenna capacitance 8, whose reactance is small compared to the radiation resistance. The shunt capacitance 8 is effectively removed by resonating it with a parallel inductance 9. The inductance 9 provides a means of adjusting the oscillator grid excitation to the optimum point by making the anode to cathode circuit either slightly inductive or slightly capacitive to compensate interelectrode capacitance differences in the oscillator tube 1*a*.

The adjustment and operation of the circuit of FIGURE 1 as an oscillating detector is well known in the proximity fuze fuze art. The operating point of the oscillator is adjusted so that the anode current is approximately independent of the load over the radiation resistance range of the antenna. This type of adjustment is just the opposite of the adjustment of the usual power oscillator, and makes the circuit of FIGURE 1 act as an oscillating detector. The usual power oscillator is adjusted so that the anode voltage, and not the anode current, remains approximately constant with changes in load. For adjustment of the circuit of FIGURE 1 as an oscillating detector with constant anode current, changes in the antenna radiation resistance 10 result in corresponding changes in the amplitude of the anode voltage. Since the voltage across the grid leak resistance 17 is dependent upon the amplitude of the anode voltage, this grid leak voltage will follow the variations in the amplitude of the anode voltage. Or, stated in another way, the voltage on the grid leak resistor 17 is the detected amplitude modulation of the radio frequency anode voltage. The adjustment for constant anode current prevents this voltage on the grid leak resistance 17 from applying negative feedback to the desired amplitude changes. As the fuze approaches a target, a Doppler signal therefore appears across the grid leak resistance 17.

Difficulties have arisen in the oscillating detector circuit of FIGURE 1 because of instability. One form of oscillator instability, is manifested by intermittent oscillation arising when the grid bias increases until the plate current and oscillation cease. This extreme grid bias decays exponentially with time at a rate determined by the grid leak and bias storage capacitance. When the bias decays to a value at which oscillation will start, the oscillation starts and grows in amplitude until the bias is again too large for the oscillator tube to function.

A second form of oscillator instability is represented by the appearance of self modulation initiated by thermal excitation of the electrons in the circuit and electron tube of the oscillator which causes fluctuations in the current flowing in the oscillator circuit and results in random changes in the amplitude of the radio frequency oscillations of the oscillator.

Both intermittent oscillation and self modulation exist because of the presence of an operating point, combination of grid bias and oscillation amplitude, that represents an unstable equilibrium in which any small deviation of the operating point produces conditions that force the operating point still further from equilibrium. If no restoring force is encountered by the operating point, oscillator instability results. If sufficient restoring force is encountered on both sides of the unstable region, the oscillator will hunt over a range of operating points.

The stability of the operating point depends on the relation between oscillation amplitude and grid bias, and or the time lag with which the bias variation follows a corresponding amplitude variation. An operating point is statically stable if a small arbitrary change of oscillation amplitude produces a greater change of bias than would be needed to keep the bias in equilibrium with the amplitude. A statically stable operating point will be dynamically unstable if the bias change does not occur rapidly enough.

Ordinarily the self-biasing action of a grid leak is sufficient to provide static stability for an oscillator. If the amplitude of oscillation increases, the grid bias is increased thereby producing static stability. The difficulty arises when the bias change cannot occur with sufficient rapidity to prevent the oscillator from drifting into an unstable operating region; that is, the oscillator has insufficient dynamic stability. The oscillating detectors of the prior art as illustrated by FIGURE 1, did not have this necessary dynamic stability and as a result proximity fuze reliability was significantly reduced.

Figure 2:
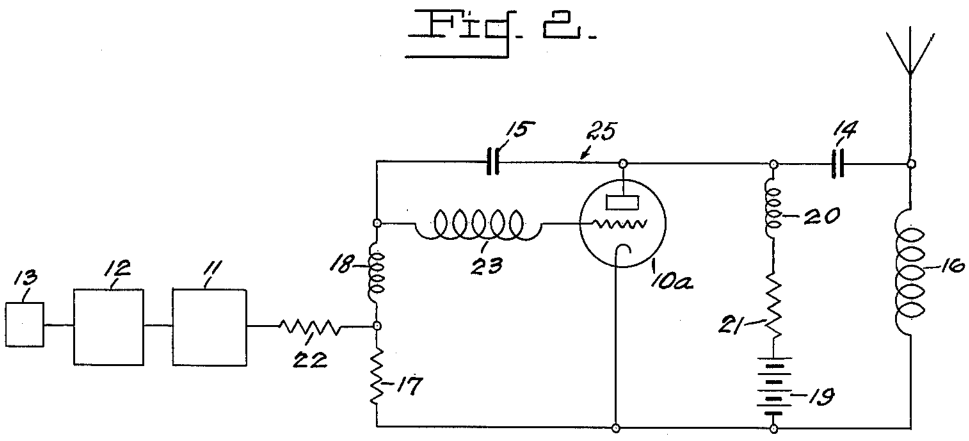
FIGURE 2 is a schematic diagram of a radio proximity fuse employing a reaction grid detector having incorporated therein the instability anticipator means of the invention.

My invention provides novel means for producing dynamic stability in an oscillating detector circuit. In FIG. 2 of the drawings there is shown a schematic diagram of a radio proximity fuse wherein 25 indicates a reaction-grid detector employing an ultra-high frequency Colpitts type oscillator circuit which is shown only for the purpose of illustration, it being understood that any standard high frequency oscillator circuit may be used. The audio frequency amplifier 11, thyratron 12 and electric detonators 13 are shown in block diagram. The audio frequency variations of the oscillator bias (detected Doppler frequency signals) are fed to the audio frequency amplifier via an isolating resistor 22. The capacitor 14 is a D.C. blocking capacitor which couples the antenna circuit to the anode of the oscillator tube. The inductor 23 of the oscillator circuit is coupled to the anode of oscillator tube by means of a D.C. blocking capacitor 15. The inductor 16 compensates the antenna capacitance and is adjusted for suitable oscillator drive. The oscillator feedback should be so adjusted as to make the anode current essentially independent of the radiation load. This feedback adjustment is important because it keeps the stabilizing resistor 21 from applying negative feedback to the desired amplitude changes. The grid leak resistor 17 is the resistance in the grid circuit across which the Doppler-frequency operating voltage is developed. The radio frequency choke coil 18 in the grid circuit of the oscillator forms the grid impedance for the oscillator and a radio frequency filter for the audio frequency voltage fed into the audio frequency amplifier. The anode power supply source 19 is also isolated from the radio frequency current by the frequency choke coil 20. The resistor 21 in the anode circuit of the oscillator is the anti-squegging or stabilizing resistor of the invention.

The circuit of FIGURE 2 provides a stable oscillating detector by means of the stabilizing resistor 21 in conjunction with the capacitor 15. The mechanism of oscillator operation and the considerations of stability are quite complex and involve a combination of events which are difficult to explain and predict. A theory of the operation of the circuit of FIGURE 2 which appears to explain how the stabilizing resistor 21 and the capacitor 15 act to provide stabilization will now be presented.

Intermittent instability and self-modulation instability, which were described previously, can be observed as a low frequency amplitude modulation or squegging of the RF anode voltage. This conditions appears to be caused by a shifting of the operating point of the oscillator to a region where the bias voltage begins to affect the gain of the stage. As the operating point approaches these regions where the gain begins to vary, amplitude of the RF oscillations will change. Once in the region, if the bias change does not occur fast enough, the action will be cumulative and will result in an amplitude modulation or squegging of the RF oscillations. If the bias voltage could be made to anticipate an approach of the operating point to such a region, and act to produce a signal which would drive the operating point away from this unstable region, it seems that instability would then be eliminated.

It can be observed that the amplitude modulation or squegging of the RF voltage is accompanied by a low frequency signal component of the anode current, which follows the amplitude modulation or squegging rate. Since this low frequency signal component of the anode current occurs only during unstable operation, it seems logical that stabilization can be produced by preventing this low frequency component of anode current from occurring.

The stabilization resistor 21 is provided to transform the low frequency component of anode current into a voltage signal. Since the choke 20 is a short circuit at low frequencies, the resistor 21 is effectively connected to the capacitor 15 as far as low frequencies are concerned. The capacitor 15 and the grid leak resistor form a low frequency differentiating network which causes a correction voltage to appear across the grid leak resistor 17 which is proportional to the rate of change of the low frequency voltage across the stabilizing resistor 21. Therefore, if a low frequency signal begins to build up, the correction voltage, which is the first time derivative of this signal, will act to prevent further build-up by changing the bias voltage accordingly. Stated another way, as the operating point approaches a region in which the gain varies, a correction signal develops which causes the bias voltage to change in a direction which drives the operating point away from the unstable region. This action results in holding the operating point in the desired region of constant gain. In this region Doppler-caused changes in the amplitude of the RF anode voltage will produce no low frequency component of anode current.

It will be apparent that the embodiment shown is only exemplary and that various modifications can be made within the scope of the invention, as defined in the appended claims.

I claim:

1. The combination of an electron tube radio frequency oscillator and means for preventing self modulation of the amplitude of the radio frequency oscillations by said oscillator due to thermal excitation of the electrons in said tube and circuit of said oscillator, said means comprising a negative feedback network having first and second branches in series, said first branch comprising a part of the anode circuit of said oscillator, said second branch comprising a part of the grid circuit of said oscillator, said first branch developing an incremental voltage thereacross due to said thermal excitation and applying said incremental voltage through said second branch to the grid of said tube as a corrective bias voltage responsive to the amplitude of said incremental voltage, thus preventing self modulation of the radio frequency oscillations of said oscillator.

2. In a reaction grid detector comprising an electron tube having grid, cathode and anode elements, a tank circuit coupling said grid and plate elements, said tank circuit comprising an inductor and capacitor series connected, grid biasing means for said tube, power supply means for the anode of said tube, a resistor connecting said power supply means and said anode, and means preventing random changes in the amplitude of the radio frequency oscillations of said reaction grid detector, said means formed by the capacitor and resistor, said resistor having an incremental voltage developed thereacross at the start of the build-up of a random change in amplitude of the radio frequency oscillations, said incremental voltage being applied to the grid of said tube through said capacitor in such a manner as to change the grid bias of said tube to prevent any further build-up in amplitude.

3. A radio frequency oscillator comprising an electron tube having a pair of principal electrodes and a control electrode, a source of voltage for supplying current flow between said principal electrodes, a radio frequency tank circuit comprising a series connected inductor and capacitor connecting one of said principal electrodes and said control electrode, biasing means for said control electrode, means coupling said radio frequency oscillator to a radiation system, and negative feedback means for reducing random changes in the amplitude of the radio frequency oscillations of said oscillator, said feedback means comprising said capacitor and a resistor connecting said one principal electrode and said source of voltage.

4. The combination of an electron tube radio frequency oscillator and a dynamic stabilizer therefor, said dynamic stabilizer comprising radio frequency oscillation amplitude variation responsive means in the anode circuit of said tube at the start of the build-up of an amplitude variation, and means in the grid circuit coupling said responsive means and the grid of said tube for applying said incremental voltage to the grid of said tube as a corrective bias in such time relationship as to prevent further build-up of the amplitude variation, said amplitude variation responsive means and said means in the grid circuit comprising an R–C differentiator.

References Cited by the Examiner

UNITED STATES PATENTS

| | | | |
|---|---|---|---|
| 2,205,233 | 6/1940 | Van Slooten | 331—171 |
| 2,363,349 | 11/1944 | Moe | 331—181 |
| 2,760,188 | 8/1956 | Guanella | 343—7 |

OTHER REFERENCES

"Radio Proximity Fuze Design," Hinman, National Bureau of Standards Research Paper RP 1723, vol. 37, July 1946, pages 4 and 5.

ROY LAKE, *Primary Examiner.*

NORMAN H. EVANS, FREDERICK M. STRADER, *Examiners.*

R. A. KUYPERS, M. A. MORRISON, J. B. MULLINS, *Assistant Examiners.*